(12) United States Patent
Roundy et al.

(10) Patent No.: US 6,397,572 B1
(45) Date of Patent: Jun. 4, 2002

(54) LAWNMOWER MOUNTABLE TRIMMING DEVICE

(76) Inventors: Chad Roundy, 484 S. Jefferson St., Rio, WI (US) 53960; John Dekeyrel, 422 Washington St., Portage, WI (US) 53901

(*) Notice: Subject to any disclaimer, the term of this patent is extended or adjusted under 35 U.S.C. 154(b) by 0 days.

(21) Appl. No.: 09/783,848

(22) Filed: Feb. 15, 2001

(51) Int. Cl.[7] ............................................. A01D 34/66
(52) U.S. Cl. ........................................ 56/13.7; 56/12.7
(58) Field of Search ................................ 56/11.6, 12.7, 56/13.7, 13.6, 16.9, 17.5, 121, 11.8, DIG. 9; 30/276

(56) References Cited

U.S. PATENT DOCUMENTS

| | | | | |
|---|---|---|---|---|
| 3,236,037 A | * | 2/1966 | Porterfield | 56/13.7 |
| 3,261,150 A | * | 7/1966 | Fitzgerald, Sr. | 56/13.7 |
| 4,453,372 A | * | 6/1984 | Remer | 56/13.7 |
| 4,642,976 A | * | 2/1987 | Owens | 56/16.9 |
| 4,663,920 A | * | 5/1987 | Skovhoj | 56/12.7 |
| 5,167,108 A | * | 12/1992 | Bird | 56/13.7 |
| 5,226,284 A | * | 7/1993 | Meechleder | 56/11.6 |
| 6,094,896 A | * | 8/2000 | Lane | 56/13.7 |

* cited by examiner

*Primary Examiner*—Robert E. Pezzuto
(74) *Attorney, Agent, or Firm*—Goldstein Law Offices, P.C.

(57) ABSTRACT

A lawnmower mountable trimming device including a mounting bracket adapted for coupling with the deck of the lawnmower. An inner arm is provided that is pivotally attached to the mounting bracket and is extendible outwardly with respect to the mounting bracket. An outer arm is provided that is extendible outwardly with respect to the inner arm. A trimmer portion is coupled with the outer arm. The trimmer portion includes a protective shield extending horizontally beneath the outer arm. The trimmer portion includes a motor disposed below the protective shield. The motor includes a cutting line extending outwardly therefrom. A wound spring is disposed within the inner arm. The wound spring aids extension and retraction of the inner and outer arms with respect to the lawnmower to extend and retract the trimmer.

6 Claims, 3 Drawing Sheets

LAWNMOWER MOUNTABLE TRIMMING DEVICE

BACKGROUND OF THE INVENTION

The present invention relates to a lawnmower mountable trimming device and more particularly pertains to allowing a person mowing a lawn to trim areas where a lawnmower cannot reach.

Currently, homeowners and lawn cutting company's separately utilize lawnmowers to first cut a lawn, and then utilize a trimmer to cut the areas of the lawn that the lawnmower was unable to reach in order to cut. This procedure tends to take a great length of time to accomplish the task of manicuring a lawn. Sometimes, lawn cutting company's hire multiple workers who are responsible for trimming while another employee handles the mowing. These examples illustrate the need for a device that will allow the mowing and trimming of a lawn to be performed at the same time with a single machine.

The present invention attempts to solve the above mentioned problem by providing a device that will allow one person to mow and trim a lawn with one single machine.

The use of lawn cutting equipment is known in the prior art. More specifically, lawn cutting equipment heretofore devised and utilized for the purpose of cutting lawns are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,896,488 to Duncan discloses a lawn trimmer device pivotally connected to the side of a lawnmower. U.S. Pat. Nos. 4,170,099 and 4,642,976, both by Owens, discloses trimmer attachments for a power lawnmower, drive by the mower engine.

While these devices fulfill their respective, particular objective and requirements, the aforementioned patents do not describe a lawnmower mountable trimming device for allowing a person mowing a lawn to trim areas where a lawnmower cannot reach.

In this respect, the lawnmower mountable trimming device according to the present invention substantially departs from the conventional concepts and designs of the prior art, and in doing so provides an apparatus primarily developed for the purpose of allowing a person mowing a lawn to trim areas where a lawnmower cannot reach.

Therefore, it can be appreciated that there exists a continuing need for a new and improved lawnmower mountable trimming device which can be used for allowing a person mowing a lawn to trim areas where a lawnmower cannot reach. In this regard, the present invention substantially fulfills this need.

SUMMARY OF THE INVENTION

In the view of the foregoing disadvantages inherent in the known types of lawn cutting equipment now present in the prior art, the present invention provides an improved lawnmower mountable trimming device. As such, the general purpose of the present invention, which will be described subsequently in greater detail, is to provide a new and improved lawnmower mountable trimming device which has all the advantages of the prior art and none of the disadvantages.

To attain this, the present invention essentially comprises a mounting bracket adapted for coupling with the deck of the lawnmower. An inner arm is provided that is extendible outwardly with respect to the mounting bracket. The inner arm has a first end and a second end. The first end is pivotally coupled with the mounting bracket. The second end has a gear disposed thereon. An outer arm is provided that is extendible outwardly with respect to the inner arm. The outer arm has a first end and a second end. The first end of the outer arm also has a gear so that the first end of the outer arm is coupled with the second end of the inner arm wherein the gear of the outer arm is engaged with the gear of the inner arm. A bridge piece is pivotally connected to both the first end of the outer arm and second end of the inner arm. A connecting rod attaches the deck with the bridge piece. The connecting rod is attached to the deck at a point distinct from the point of pivotal attachment of inner arm thereto, creating eccentric movement of the bridge piece as the inner arm pivots with respect to the deck. A trimmer portion is coupled with the second end of the outer arm. The trimmer portion includes a protective shield extending downwardly from the second end of the outer arm, a motor disposed below the protective shield, and one or more cutting lines extending outwardly therefrom. A wound spring is disposed at the inner arm pivot point of the deck to bias the inner arm into an extended position. An activation lever causes the inner and outer arms to extend outwardly from the lawnmower may be solenoid activated to automate retraction and extension of the trimmer. The wound spring allows the trimmer to retract and fold against the deck when a obstacle is encountered, and biases the trimmer outward so that it will re-extend once the obstacle is cleared.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lawnmower mountable trimming device which has all the advantages of the prior art lawn cutting equipment and none of the disadvantages.

It is another object of the present invention to provide a new and improved lawnmower mountable trimming device which may be easily and efficiently manufactured and marketed.

It is a further object of the present invention to provide a new and improved lawnmower mountable trimming device which is of durable and reliable construction.

An even further object of the present invention is to provide a new and improved lawnmower mountable trimming device which is susceptible of a low cost of manufacture with regard to both materials and labor, and which accordingly is then susceptible of low prices of sale to the consuming public, thereby making such a lawnmower mountable trimming device economically available to the buying public.

Even still another object of the present invention is to provide a new and improved lawnmower mountable trimming device for allowing a person mowing a lawn to trim areas where a lawnmower cannot reach.

Lastly, it is an object of the present invention to provide a new and improved lawnmower mountable trimming device including a mounting bracket adapted for coupling with the deck of the lawnmower. An inner arm is provided that is extendible outwardly with respect to the mounting bracket. An outer arm is provided that is extendible outwardly with respect to the inner arm. A trimmer portion is coupled with the outer arm. The trimmer portion includes a protective shield extending downwardly from the outer arm. The trimmer portion includes a motor disposed below the protective shield, and an adjustment knob which threads onto an adjustment rod to adjust trimming height. A wound spring is disposed within the inner arm. The coil spring selectively extends and retracts trimmer with respect to the lawnmower.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
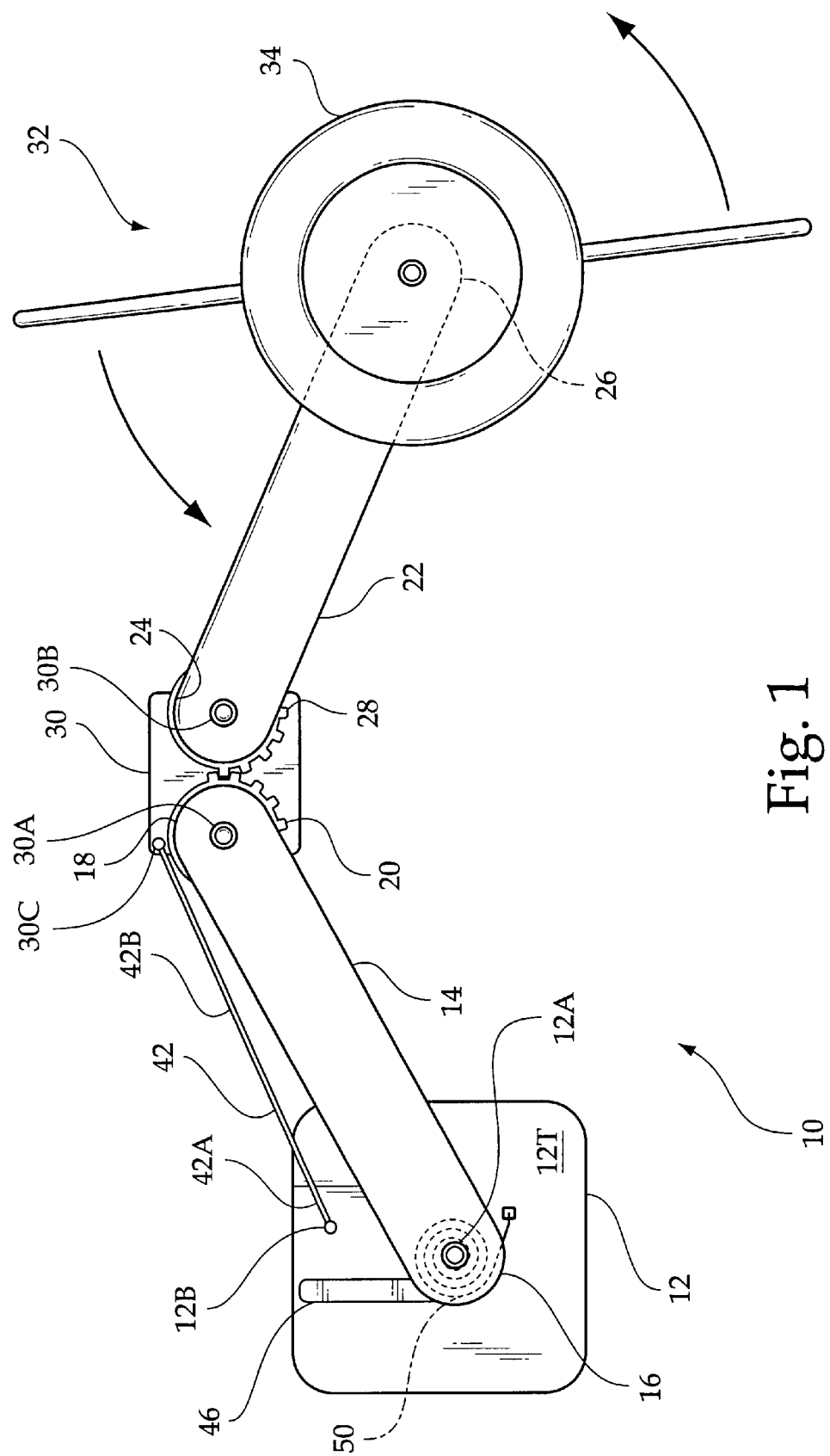
FIG. 1 is a plan view of the preferred embodiment of the lawnmower mountable trimming device constructed in accordance with the principles of the present invention.
Figure 2:
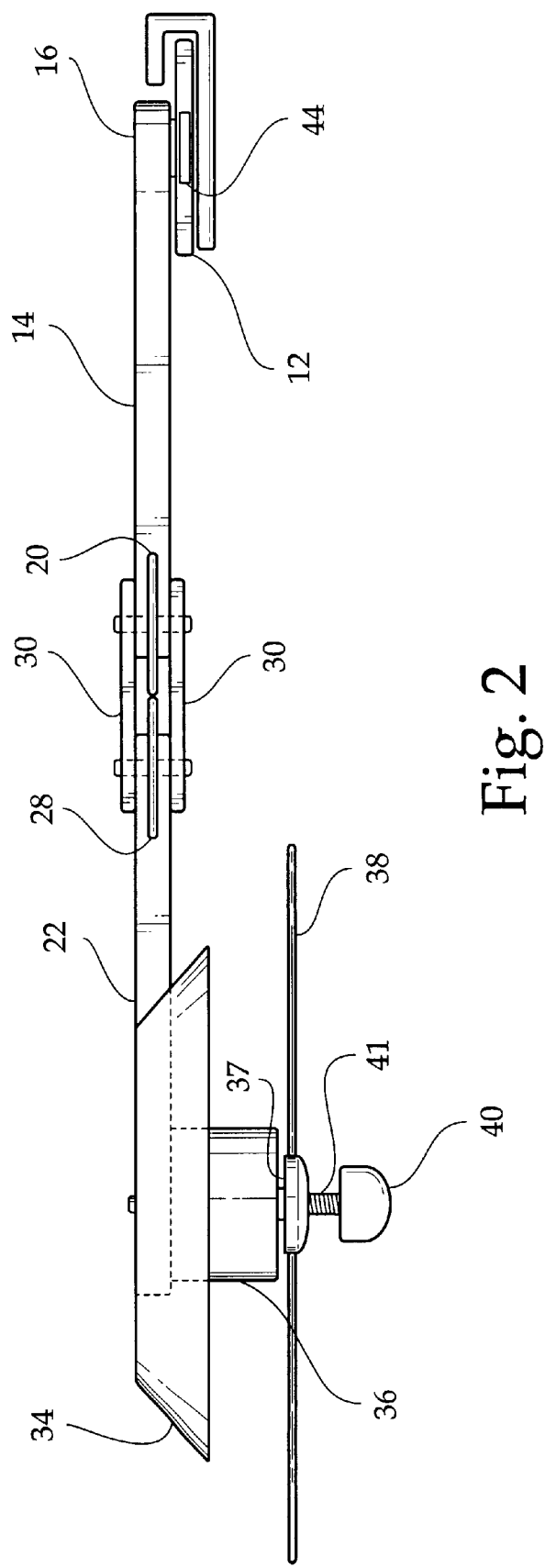
FIG. 2 is a side elevation view of the present invention.
Figure 3:
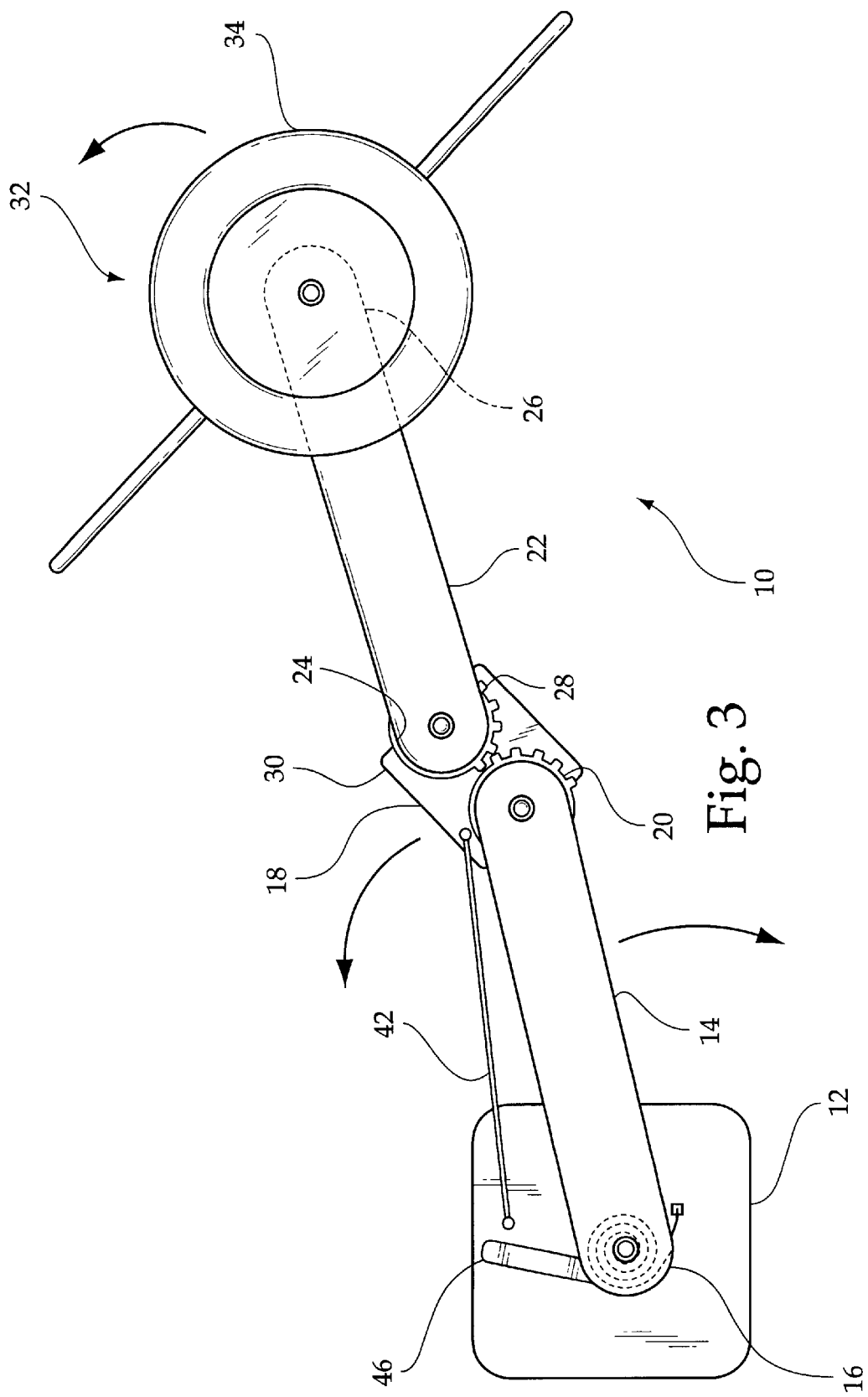
FIG. 3 is a plan view similar to FIG. 1, except wherein the trimmer is extended slightly further.

With reference now to the drawings, and in particular, to FIGS. 1, 2, and 3 thereof, the preferred embodiment of the new and improved lawnmower mountable trimming device embodying the principles and concepts of the present invention and generally designated by the reference number 10 will be described.

Specifically, it will be noted in the various figures that the device relates to a lawnmower mountable trimming device for allowing a person mowing a lawn to trim areas where a lawnmower cannot reach. Lawn mover as defined herein includes both hand-push and riding type lawnmowers. In its broadest context, the device comprises a mounting bracket 12, an inner arm 14, an outer arm 22, a bridge 30, a trimmer portion 32, and a wound spring 50. Such components are individually configured and correlated with respect to each other so as to attain the desired objective.

The mounting bracket 12 is adapted for coupling with the deck of the lawnmower. The mounting bracket 12 has a top surface 12T. In the preferred embodiment, the mounting bracket 12 can be adapted to be secured under or on top of the deck. It can be mounted on the left or right hand sides of the lawnmower. It should be noted then, that conventions such as "clockwise" and "counter-clockwise" as used herein are strictly relative, and such designations may be reversed consistently for left hand and right hand versions.

The inner arm 14 has a first end 16 and a second end 18. The first end 16 of the inner arm 14 is attached to the mounting bracket 12 at a first bracket pivot point 12A on the top surface 12T. The inner arm 14 is extendible outwardly with respect to the mounting bracket 12 by pivoting about the first bracket pivot point 12A. The second end 18 has a gear 20 disposed thereat which is rigidly attached thereto. An activation lever 46 is attached to the first end, for manipulating the inner arm 14 such that it pivots about the first bracket pivot point 12A. Although an activation lever 46 is shown for simplicity, it should be appreciated that a mechanism may be coupled therewith to allow automatic or machine driven manipulation of the inner arm. Accordingly, any suitable electromechanical, pneumatic, or hydraulic means may be provided to allow the user to control the movement of the inner arm to either deploy or store the trimming device, especially to allow remote control thereof from the driver's seat of a riding lawnmower.

The bridge 30 is pivotally attached to second end 18 of the inner arm 14 at a first bridge pivot point 30A. The outer arm 22 has a first end 24 and a second end 26. The first end 24 of the outer arm 22 is pivotally coupled with the bridge 30 at a second bridge pivot point 30B. However, the first end 24 of the outer arm 22 has a gear 28 disposed thereon which is engaged with the gear 20 of the inner arm 14. The outer arm 22 is thereby capable of "elbow-like" motion wherein the outer arm 14 and inner arm pivot toward and away from each other, minimizing and maximizing an angle between the inner arm 14 and outer arm 22.

The trimmer portion 32 is coupled with the second end 26 of the outer arm 22. The trimmer portion 32 includes a protective shield 34 extending substantially horizontally beneath the second end 26 of the outer arm 22. The trimmer portion 32 includes a motor 36 disposed below the protective shield 34. The motor 36 includes a vertical shaft 37 and a cutting line 38 extending radially outwardly therefrom. The trimmer portion 32 operates in a manner similar to trimmers known in the art, wherein the motor causes the vertical shaft 37 to rotate, swinging the cutting line 38 rapidly therearound, creating a horizontal "cutting circle".

To adjust the vertical height of the "cutting circle", a threaded adjustment rod 41 extends beneath the vertical shaft 37, and is coaxial therewith. An adjustment knob 40 is a semi-spherical projection which contacts the ground when the trimmer is in use and thereby defines a cutting height as the distance between the cutting line 38 and the lowest point of the adjustment knob 40. However, the cutting height is adjustable by selectively threading the adjustment knob 40 onto the threaded adjustment rod 41 to move the adjustment knob 40 upward and downward.

To provide suitable extension and retraction of the trimmer 32 through movement of the inner arm 14 and outer arm 22, a connecting rod 42 is provided between the mounting bracket 12 and the bridge 30. The connecting rod 42 is a rigid rod having two ends, namely a first connecting rod end 42A and a second connecting rod end 42B. The first connecting rod end 42A is pivotally connected to the mounting bracket 12 at a second bracket pivot point 12B on the top surface 12T. The second connecting rod end 42B is connected to the bridge 30 at a third bridge pivot point 30C. Because the connecting rod 42 is connected to both the bridge 30 and the mounting bracket 12 at distinct pivot points compared to the inner arm 14, eccentric motion of the bridge 30 is created. In particular, as the inner arm 14 pivots clockwise at the mounting bracket 12, the bridge 30 has a tendency to pivot counter-clockwise at the inner arm 14 (at the first bridge pivot point 30A) when the inner arm 14 pivots clockwise at the first bracket pivot point 12A. This pivoting of the bridge 30 acts to further extend the trimmer 32 by swinging the outer arm 22 counter-clockwise as well. Accordingly, the bridge 30 causes the outer arm 22 to extend faster and retract faster than it would if it were simply geared to the inner arm 14.

The wound spring 50 is a spiral coil, similar to a watch spring, and is disposed within the inner arm 14 and is coupled between the inner arm 14 at the first bracket pivot point 12A, and the mounting bracket 14. The wound spring 50 is oriented so that it biases the inner arm 14 in the clockwise direction. That is, when the inner arm 14 is moved in the counter-clockwise direction as it is retracted, the wound spring 50 stores potential energy, which gives the inner arm 14 a tendency to move in the clockwise direction, to re-extend the inner arm 14 and thus the trimmer 32. Accordingly, when the trimmer 32 encounters an obstacle such as a tree, it is pushed inward, retracting the trimmer 32 toward the deck, folding the outer arm 22 against the inner arm 14. In doing so, potential energy is stored within the wound spring 50. Thus, when the tree or obstacle is "out of the way", the wound spring 50 will urge the inner arm 14 in the clockwise direction, extending the trimmer 32 outward once again.

As to the manner of usage and operation of the present invention, the same should be apparent from the above description. Accordingly, no further discussion relating to the manner of usage and operation will be provided.

With respect to the above description them, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lawnmower mountable trimming device for allowing a person mowing a lawn to trim areas where a lawnmower cannot reach, the lawnmower having a deck, the trimming device comprising, in combination:

a mounting bracket adapted for coupling with the deck of the lawnmower;

an inner arm being extendible outwardly with respect to the mounting bracket, the inner arm having a first end and a second end, the first end being pivotally coupled with the mounting bracket at a first bracket pivot point, the second end having a gear disposed thereon;

a bridge, the second end of the inner arm pivotally connected to the bridge;

an outer arm being extendible outwardly with respect to the inner arm, the outer arm having a first end and a second end, the first end of the outer arm being pivotally coupled with the bridge, the first end of the outer arm also having a gear disposed thereon, said gear of said outer arm being engaged with the gear of the inner arm;

a connecting rod having a first connecting rod end and a second connecting rod end, the first connecting rod end attached to the mounting bracket at a location distinct from first bracket pivot point, the second connecting rod end attached to the bridge for creating eccentric movement of the bridge when the first arm is pivoted;

a trimmer portion coupled with the second end of the outer arm, the trimmer portion including a protective shield extending horizontally beneath the second end of the outer arm, the trimmer portion including a motor disposed below the protective shield, the motor having a vertical shaft, the trimmer further having a cutting line linked to the vertical shaft; and a wound spring attached to the inner arm at the first bracket pivot point, the wound spring biasing the inner arm clockwise, tending to cause the inner and outer arms to extend outwardly from the lawnmower allowing the inner and outer arms to selectively fold inwardly against the deck of the lawnmower.

2. The lawnmower mountable trimming device as set forth in claim 1, further comprising a threaded adjustment rod extending beneath the vertical shaft and cutting line, and an adjustment knob located on the threaded adjustment rod such that the adjustment knob may be selectively moved upward and downward upon the threaded adjustment rod to raise and lower cutting height of the cutting line.

3. A lawnmower mountable trimming device for allowing a person mowing a lawn to trim areas where a lawnmower cannot reach, the lawnmower having a deck, the trimming device comprising, in combination:

a mounting bracket adapted for coupling with the deck of the lawnmower;

an inner arm pivotally mounted to the mounting bracket and extendible outwardly with respect to the mounting bracket, the inner arm having a gear;

an outer arm being extendible outwardly with respect to the inner arm, the outer arm having a gear, said outer arm being pivotally coupled with the inner arm by the gears;

a trimmer portion coupled with the outer arm, the trimmer portion including a protective shield extending horizontally beneath the outer arm, the trimmer portion including a motor disposed below the protective shield, the motor including a cutting line extending outwardly therefrom; and a wound spring mounted to the inner arm at a first bracket pivot point and to the mounting bracket to bias the inner arm in the clockwise direction for extending the trimmer outward with respect to the lawnmower.

4. The lawnmower mountable trimming device as set forth in claim 3, wherein the inner arm has an inner arm second end and the outer arm has an outer arm first end, and further comprising a bridge, the bridge pivotally connected to the inner arm second end, the bridge also pivotally connected to the outer arm first end.

5. The lawnmower mountable trimming device as recited in claim 4, further comprising a connecting rod having a first connecting rod end and a second connecting rod end, the mounting bracket having a second bracket pivot point which is distinct from the first bracket pivot point, the connecting rod first end is attached to the mounting bracket at the first bracket pivot point, and wherein the connecting rod second end is attached to the bridge, for creating eccentric motion of the bridge when the inner arm is pivoted.

6. The lawnmower mountable trimming device as set forth in claim 5, further comprising a threaded adjustment rod, extending beneath a vertical shaft and cutting line, and an adjustment knob located on a threaded adjustment rod such that the adjustment knob may be moved upward and downward upon the threaded adjustment rod to raise and lower cutting height of the cutting line.

* * * * *